United States Patent
Berendes

(10) Patent No.: US 9,422,761 B2
(45) Date of Patent: Aug. 23, 2016

(54) DEVICE FOR INVALIDATING VALUABLE DOCUMENTS AND CASH BOX HAVING SUCH A DEVICE

(71) Applicant: Wincor Nixdorf International GmbH, Paderborn (DE)

(72) Inventor: Elmar Berendes, Warburg (DE)

(73) Assignee: Wincor Nixdorf International GmbH (DE)

( * ) Notice: Subject to any disclaimer, the term of this patent is extended or adjusted under 35 U.S.C. 154(b) by 0 days.

(21) Appl. No.: 14/383,258

(22) PCT Filed: Mar. 15, 2013

(86) PCT No.: PCT/EP2013/055337
§ 371 (c)(1),
(2) Date: Sep. 5, 2014

(87) PCT Pub. No.: WO2013/135857
PCT Pub. Date: Sep. 19, 2013

(65) Prior Publication Data
US 2015/0027354 A1 Jan. 29, 2015

(30) Foreign Application Priority Data
Mar. 16, 2012 (DE) .......... 10 2012 102 223

(51) Int. Cl.
*E05G 1/12* (2006.01)
*E05G 1/00* (2006.01)
*E05G 1/14* (2006.01)

(52) U.S. Cl.
CPC .......... *E05G 1/12* (2013.01); *E05G 1/005* (2013.01); *E05G 1/14* (2013.01)

(58) Field of Classification Search
CPC .......... E05G 1/12; E05G 1/14; E05G 1/00; E05G 1/005; G06Q 30/0185; G08B 15/02

USPC ........ 109/25, 26, 29, 30, 31, 33, 34, 36
See application file for complete search history.

(56) References Cited

U.S. PATENT DOCUMENTS 1,606,258 A * 11/1926 Morssen .......... 109/25
2,804,029 A * 8/1957 Fitzgerald .......... 109/34
(Continued)

FOREIGN PATENT DOCUMENTS

BE 0914538 A1 * 5/1999 .......... E05G 1/14
CN 101644125 A 2/2010
(Continued)

OTHER PUBLICATIONS

Ashby, Mike Johnson, Kara. (2010). Materials and Design—The Art and Science of Material Selection in Product Design (2nd Edition)—Snap Fits. Elsevier. Online version available at: http://app.knovel.com/hotlink/pdf/id:kt007DQT71/materials-design-art/snap-fits.*
(Continued)

*Primary Examiner* — Christopher Boswell
*Assistant Examiner* — Amanda L Miller
(74) *Attorney, Agent, or Firm* — Harness, Dickey & Pierce, P.L.C.

(57) ABSTRACT

Device for invalidating notes of value, which comprises at least one combined dyestuff and trigger module, the dyestuff and trigger module being connectable via at least one first connecting element to a second connecting element of the value note transport container complementary to the first connecting element. The device has a dyestuff distributing unit for distributing dyestuff exiting from an outlet opening of the dyestuff and trigger module onto the notes of value. By means of the first connecting element a disconnectable plug connection to the second connecting element is establishable. Further, the disclosure relates to a cash box comprising such a device.

15 Claims, 12 Drawing Sheets

(56) References Cited

U.S. PATENT DOCUMENTS

| | | | | |
|---|---|---|---|---|
| 4,712,489 | A | * | 12/1987 | Levavasseur .................... 109/25 |
| 4,799,435 | A | * | 1/1989 | Boutroy ........................... 109/25 |
| 6,193,678 | B1 | * | 2/2001 | Brannon .......................... 601/15 |
| 6,259,366 | B1 | * | 7/2001 | Lindskog et al. ........ 340/568.7 |
| 6,453,828 | B1 | * | 9/2002 | Fumanelli ....................... 109/25 |
| 6,536,348 | B1 | * | 3/2003 | Gral ............................... 102/293 |
| 6,564,726 | B1 | * | 5/2003 | Lindskog ........................ 109/25 |
| 6,712,011 | B2 | * | 3/2004 | Fumanelli ....................... 109/20 |
| 7,950,653 | B2 | | 5/2011 | Berendes |
| 8,500,000 | B2 | | 8/2013 | Berendes |
| 8,555,792 | B2 | | 10/2013 | Berendes |
| 8,567,773 | B2 | | 10/2013 | Berendes |
| 8,579,642 | B2 | | 11/2013 | Berendes |
| 8,640,913 | B2 | | 2/2014 | Berendes |
| 2003/0033965 | A1 | * | 2/2003 | Van Lint ......................... 109/29 |
| 2004/0144569 | A1 | * | 7/2004 | Pritchard ................ E05G 1/14 175/99 |
| 2004/0154500 | A1 | * | 8/2004 | Richard et al. ................ 109/25 |
| 2009/0235847 | A1 | * | 9/2009 | Villiger ........................... 109/25 |
| 2012/0199507 | A1 | | 8/2012 | Berendes |

FOREIGN PATENT DOCUMENTS

| | | | |
|---|---|---|---|
| DE | 10-2007-015382 | B4 | 12/2010 |
| FR | 2792509 | A1 | 10/2000 |
| FR | 2858005 | A1 | 1/2005 |
| GB | 2430469 | A * | 3/2007 |
| WO | WO-92-06611 | A1 | 4/1992 |
| WO | WO-2006-084853 | A1 | 8/2006 |
| WO | WO-2011-070067 | A1 | 6/2011 |
| WO | WO-2011-144611 | A1 | 11/2011 |

OTHER PUBLICATIONS

International Search Report (in English and German) for PCT/EP2013/055337, mailed Jul. 18, 2013; ISA/EP.

International Preliminary Report on Patentability for PCT/EP2013/055337 (Sep. 25, 2014) with English Translation (14 pages).

Office Action issued by the State Intellectual Property Office (SIPO) of the People's Republic of China dated Oct. 20, 2015 w/English translation (16 pages).

* cited by examiner

US 9,422,761 B2

DEVICE FOR INVALIDATING VALUABLE DOCUMENTS AND CASH BOX HAVING SUCH A DEVICE

CROSS-REFERENCE TO RELATED APPLICATIONS

This application is a National Stage of International Application No. PCT/EP2013/055337, filed on Mar. 15, 2013, and published in German as WO 2013/135857 A1 on Sep. 19, 2013. This application claims the benefit and priority of German Application No. 10 2012 102 223.2, filed on Mar. 16, 2012. The entire disclosures of the above applications are incorporated herein by reference.

BACKGROUND

This section provides background information related to the present disclosure which is not necessarily prior art.

1. Technical Field

The disclosure relates to a device for invalidating notes of value comprising at least one combined dyestuff and trigger module which is connectable to a value note transport container via connecting elements. The device comprises a dyestuff distributing unit for distributing dyestuff exiting from an outlet opening of the dyestuff and trigger module onto the notes of value to be invalidated. Such devices are also referred to as ink kit. Further, the disclosure relates to a cash box for receiving banknotes, which comprises a device for invalidating notes of value.

2. Discussion

From document WO 2006/084853 A1, an installation kit for equipping a case as a multifunctional, portable security system is known, in which valuables present in the case are protected. The installation kit comprises an electrically triggerable igniter and an ink module for inking the valuables. The electrically triggerable igniter is triggerable by means of a control unit so that the ink, after triggering, is pressurized and the ink comes out of an outlet area for discharging the ink. The control unit controls the igniter dependent on sensor signals.

From document WO 2011/144611 A1, a device for invalidating notes of value is known, in which a trigger unit, which brings the dyestuff contained in a dyestuff container into contact with notes of value, is arranged inside the dyestuff container. As a result, a very simple, compact and tamper-resistant arrangement of dyestuff container and trigger unit is specified.

The trigger unit comprises a gas supply which is connected to the dyestuff container via a closed closing element. This closing element can, if necessary, be opened by an appropriate control of the control unit. For opening this connection, for example, a blasting cap may be provided. The energy required for opening the closing element, for triggering the blasting cap and/or for operating the control unit is provided by a battery arranged in the value note transport container.

In particular, the dyestuff and the battery are subject to an aging and discharging process, respectively, and have to be replaced within predetermined maintenance intervals. In known value note transport containers, a replacement of dyestuff and trigger modules as well as of the battery can only be made by the manufacturer or by specialized companies. For this, a complex transport of the value note transport containers to these specialized companies is required. Further, the replacement involves a relatively high effort for assembly so that a considerable amount of money has to be spent on the maintenance of devices for invalidating notes of value in value note transport containers.

SUMMARY OF THE DISCLOSURE

It is an object of the disclosure to specify a device for invalidating notes of value and a cash box comprising such a device, in which an easy replacement of components of the device which are to be maintained is possible.

By the disconnectable plug connection between the first connecting element and the second connecting element a dyestuff and trigger module to be replaced can be removed easily from the value note transport container, wherein a new or regenerated dyestuff and trigger module can easily be connected to the second connecting element of the value note transport container via the first connecting element in that the plug connection between the first connecting element and the second connecting element is established. Here, the first connecting element can be replaced together with the dyestuff and trigger module, wherein the first connecting element can be connected to the dyestuff and trigger module via a disconnectable or a permanent connection or can be integrated into the dyestuff and trigger module. Preferably, the dyestuff distributing unit as well as control or firing cables for activating the dyestuff and trigger module are connectable to the dyestuff and trigger module via appropriate plug connectors so that the replacement of the dyestuff and trigger module can not only be made by skilled people who are specially trained for that but generally by technically experienced people since no special knowledge is required for such replacement. In particular, the value note transport container in which the dyestuff and trigger module is arranged does not have to be transported to the manufacturer or specialized service centers for a replacement of the dyestuff and trigger module. As a result, the maintenance of devices for invalidating notes of value, i.e. of so-called ink kits, which can comprise a combined dyestuff and trigger module, a dyestuff distributing unit, a control unit and a battery for the power supply of the control unit and/or the trigger unit for triggering the dyestuff and trigger module, can easily be carried out.

It is particularly advantageous when the dyestuff distributing unit comprises at least one spray pipe having in its wall several openings for the discharge of the dyestuff fed to the spray pipe, through which openings the dyestuff reaches the notes of value contained in the value note transport container. As a result, the notes of value arranged in the value note transport container in particular as a value note stack can be inked reliably when the openings are arranged and oriented appropriately so that, when manipulation attempts are detected by means of sensors of the value note transport container, the control unit controls the dyestuff and trigger module such that dyestuff is fed to the spray pipe with such a pressure that the dyestuff exiting through the openings in the spray pipe is discharged onto all notes of value arranged in the value note receiving area of the value note transport container and invalidates these by means of the dyestuff.

It is particularly advantageous when the device has at least two dyestuff and trigger modules which are arrangeable in one single value note transport container. Preferably, the dyestuff and trigger modules are each connectable via a disconnectable connection to a dyestuff distributing unit, preferably to one spray pipe each, in a dyestuff-tight manner. The connection between the dyestuff and trigger module and the dyestuff distributing unit or the spray pipe is preferably established via a plug connection, wherein the spray pipe or a pipe of the dyestuff distributing unit is plugged into an outlet opening of the respective dyestuff and trigger module. In the opening and/or at the pipe sealing means may be provided by means of which a dyestuff-tight connection between the pipe and the respective dyestuff and trigger module is establishable by simply plugging the pipe into the outlet opening. It is particularly advantageous when the at least two dyestuff and trigger modules are controllable by means of a common control unit so that both dyestuff and trigger modules are triggered simultaneously and the dyestuff provided by both dyestuff and trigger modules is simultaneously discharged onto the notes of value contained in the value note transport container. As a result, an easy control of the dyestuff and trigger module is possible.

It is particularly advantageous when the dyestuff and trigger modules are combined to one unit. The unit is connectable to the value note transport container via the disconnectable plug connection between the first connecting element and the second connecting element of the value note transport container. As a result, an easy replacement of the unit comprising the two dyestuff and trigger modules is possible so that an easy and time-saving replacement option for all dyestuff and trigger modules present in the value note transport container is possible in one single operation.

Further, it is advantageous when the dyestuff and trigger modules are arranged next to one another, in particular when the longitudinal axes of the dyestuff and trigger modules are arranged on parallel straight lines which extend in a plane that is orthogonal to the stacking direction of a value note stack arranged in the value note transport container. Preferably, the stacking direction extends along a normal of this plane. It is particularly advantageous when this orthogonal plane extends parallel to the face side of the value note stack, the face side of the value note stack being formed by the front and/or rear side of a note of value of the value note stack. In this way, a very space-saving arrangement of the dyestuff and trigger modules in front of or behind the value note stack on top of one another is possible. The dyestuff and trigger modules preferably have a cylindrical basic form, i.e. they have a circular cross-section at least in a portion thereof, the longitudinal axis running through the center of the circular cross-section.

It is particularly advantageous when the dyestuff and trigger modules are identically constructed. This allows a cost-efficient production of the dyestuff and trigger modules. Further, in this way an easy and space-saving arrangement of the dyestuff and trigger modules in the value note transport container is possible. It is particularly advantageous when the exit openings of the dyestuff and trigger modules are arranged on opposite sides so that the first exit opening is arranged on the one side of a plane arranged orthogonally to both longitudinal axes of the dyestuff and trigger modules and cutting the dyestuff and trigger modules in their central area and the second exit opening is arranged on the opposite side of this plane. Preferably, the longitudinal axis of the value note stack lies in this plane. As a result, a first dyestuff distributing unit can be arranged easily on one side of the value note stack and a second dyestuff distributing unit can be arranged on a second side of the value note stack opposite to the first side, without pressure-reducing cross-connections and distributing devices being required.

It is particularly advantageous when a first end of the dyestuff and trigger module is received in a first receiving area of the first connecting element and when a second end of the dyestuff and trigger module opposite to the first end is received in a first receiving area of a third connecting element, wherein a disconnectable plug connection to a fourth connecting element of the value note transport container is establishable by the third connecting element. Here, it is particularly advantageous when the exit openings are arranged opposite one another, as already explained. By way of the two disconnectable plug connections between the first and the second or third and fourth connecting element a safe accommodation of the dyestuff and trigger module in the value note transport container is possible, wherein the two plug connections can be established or disconnected simultaneously, when arranged appropriately. Preferably, the dyestuff and trigger module is simply pulled out of the value note transport container, the plug connections between the first and second connection element as well as between the third and fourth connecting element being disconnected simultaneously during removal. As a result, both a safe holding of the dyestuff and trigger module in the value note transport container by the two plug connections is guaranteed and an easy removal of the dyestuff and trigger module from the value note transport container is possible.

If at least two dyestuff and trigger modules are provided, then it is advantageous when a first end of the first dyestuff and trigger module is received in a first receiving area of the first connecting element, when a second end of the dyestuff and trigger module opposite to the first end is received in a first receiving area of a third connecting element, when a first end of the second dyestuff and trigger module is received in a second receiving area of the first connecting element, when a second end of the second dyestuff and trigger module opposite to the first end is received in a second receiving area of the third connecting element and when by means of the third connecting element a disconnectable plug connection to a fourth connecting element of the value note transport container is establishable. The fourth connecting element is preferably firmly connected to the value note transport container or integrated into a component part of the value note transport container. As a result, the two dyestuff and trigger modules can be combined into one unit by means of the first and the third connecting element as well as, via the two disconnectable plug connections, simply be connected, together as one unit, to the value note transport container and disconnected therefrom. The ends of the dyestuff and trigger modules can each be connected to the respective connecting element via suitable types of connections, such as press-fit connections, snap connections or by means of fastening means such as nuts, screws or snap rings, or by means of adhesive or by means of welding connections. Here, also different types of connections can be provided at opposite ends of the dyestuff and trigger modules. Moreover, the connecting elements can be integrated into the dyestuff and trigger module, in particular into the housing of a dyestuff and trigger module.

It is particularly advantageous when a locking element for locking the dyestuff and trigger module or the dyestuff and trigger modules in the value note transport container in the position in which the first connecting element and the second connecting element are connected via the plug connection is provided. The locking element can be designed such that it locks the plug connection between the first connecting element and the second connecting element by an additional positive connection, that the dyestuff and trigger module is connectable to the value note transport container by means of the locking element via a positive connection or that the first connecting element and/or the third connecting element are connectable to the value note transport container via a positive connection.

It is particularly advantageous when a non-positive connection is establishable between the value note transport container and the at least one dyestuff and trigger module via the plug connection between the first connecting element and the second connecting element or between the third connecting element and the fourth connecting element. In this way, the plug connection can easily be established and disconnected. It is particularly advantageous when the value note transport container has a receiving area for receiving the notes of value, the receiving area being accessible via an access opening which is closable by means of a closing element. Here, the notes of value can be received both in a drum storage providing the receiving area or as a value note stack in the receiving area.

Further, it is advantageous when the device has a battery for the power supply of a control unit and/or of a trigger unit for controlling or triggering the dyestuff and trigger module or the dyestuff and trigger modules, which is accessible only when the access opening is opened. As a result, attempts to manipulate the power supply can effectively be prevented since the power supply is only reachable upon opening of the access opening, monitored with the aid of sensors, so that in the case of an activated device for invalidating notes of value, i.e. in the case of an activated ink kit, the notes of value present in the receiving area are invalidated already upon opening of the access opening, in particular upon opening of a cover for closing the access opening.

It is particularly advantageous when a battery compartment is provided that is accessible when the access opening is opened, which battery compartment can be closed by means of a battery compartment cover. As a result, the battery in the battery compartment can be protected in an easy manner so that, on the one hand, the battery cannot fall out of the battery compartment during transport of the value note transport container and, on the other hand, an easy replacement of the battery arranged in the battery compartment is possible. It is particularly advantageous when the battery is connectable electrically to a control unit for controlling an igniter of the trigger unit of the dyestuff and trigger module via a connecting cable firmly connected to the battery and via a plug connector arrangement. The battery can be connected to the connecting cable via connecting terminals, soldering lugs or plug connectors. By means of the connecting cable firmly connected to the battery, the connecting cable can easily be connected to a suitable plug connector of the value note transport container, in particular to a complementary plug connector provided at the control unit. As a result, an easy replacement of the battery is possible. Special expert knowledge or special craft skills are not required for this.

It is particularly advantageous when the second connecting element is formed by at least one recess in a sidewall and/or in the bottom of the value note transport container and when the first connecting element is formed by a contact area of the dyestuff and trigger module that is complementary to the second connecting element. As a result, simple and cost-efficient connecting elements can be provided by which a reliable plug connection between the dyestuff and trigger module and the value note transport container is possible. Preferably, the plug connections between the first connecting element and the second connecting element as well as between the third connecting element and the fourth connecting element are no electric plug connections but are formed as a fit, in particular as a clearance fit. It is particularly advantageous when the second connecting element or the second and the fourth connecting element are each formed by an opening formed in the value note transport container and/or by an element projecting in the value note transport container. As a result, these connecting elements can be provided easily and cost-efficiently or can be integrated easily into the value note transport container.

It is particularly advantageous when the notes of value are receivable in a receiving area of the value note transport container as a stack and when dyestuff exit openings of the dyestuff distributing unit for distributing the dyestuff are arranged laterally with respect to the stack, preferably on two opposite sides of the stack parallel to the stacking direction or parallel to the longitudinal axis of the stack which extends in stacking direction. As a result, it can be ensured in an easy manner that all notes of value of the value note stack are at least partly inked with dyestuff when the dyestuff and trigger module is triggered.

It is particularly advantageous when the dyestuff distributing unit or the dyestuff distributing units are disconnectably connectable to the value note transport container via at least one snap connection. When the dyestuff distributing units are designed as a spray pipe, these are disconnectably connectable to the value note transport container via one snap connection each. Here, the snap connections can be established via an adapter. Further, it is advantageous when the dyestuff distributing unit is connected to the adapter or is held by it, the adapter being connectable disconnectably to the value note transport container via the snap connection. When two dyestuff distributing units are provided, one dyestuff distributing unit each can be connected to one adapter each or can be held by it, the adapter in turn being connectable disconnectably to the value note transport container via the snap connection. Further, the respective dyestuff distributing unit can be connected to the adapter via a snap connection or merely be held by the adapter. Alternatively or additionally, a positive connection between the dyestuff distributing unit and the value note transport container is establishable via the adapter, in particular by means of at least one bracket or clamp provided by the adapter.

As a result, on the one hand, an easy locking of the dyestuff distributing unit in the required position in the value note transport container is possible and, on the other hand, the connection between the dyestuff distributing unit and the value note transport container can again be disconnected easily via the snap connection so that the dyestuff distributing unit or the dyestuff distributing units can be disconnected both easily from the value note transport container and from the dyestuff and trigger module when replacing the dyestuff and trigger module or the dyestuff and trigger modules, wherein the dyestuff distributing units are subsequently again connected to the further dyestuff and trigger module or the further dyestuff and trigger modules and subsequently can be connected to the value note transport container.

A second aspect of the disclosure relates to a cash box comprising a device according to the first aspect of the present disclosure or an above-mentioned development of this device, the cash box being insertable into an automated teller machine and being removable therefrom. As a result, the cash box is easily suited for a safe transport of notes of value, in particular of banknotes, wherein the notes of value present in the cash box can be invalidated by means of the device when an attempt to manipulate the cash box is detected. Thus, the cash box is suited to transport notes of value, in particular banknotes, in the value note transport container to the automated teller machine and away from the automated teller machine in particular to another bank branch, to a headquarter of the bank, to a Land Central Bank, to the Federal Bank and/or to a retail company.

When the notes of value are stored in the value note transport container in the form of a stack, it is advantageous when the notes of value are arranged in the receiving area of the value note transport container standing upright on their longitudinal side when the cash box is arranged in a feed and/or removal position in the automated teller machine, wherein the notes of value are feedable to the value note transport container via a feed and/or removal opening and are removable therefrom.

The value note transport container can in particular be a cash box, preferably a recycling cash box, a dispensing cash box or a deposit cash box. Optionally or alternatively, the value note transport containers can be fed to other devices for handling notes of value, such as an automatic cash safe or a retail cash register system.

Snap connections are connections between two component parts, in which a wing part elastically deforms and subsequently gets caught disconnectably or non-disconnectably in a corresponding contact area of the second component part. Thus, a positive connection exists. The wing part is formed in the first component part or firmly connected thereto. In snap connections, thus preferably a functional integration of the connecting elements into the component parts takes place, as a result whereof a considerable simplification of the mounting process can be achieved. In particular, when the snap connection is suitably designed, the mounting processes can be performed in a tool-free manner. In the mentioned embodiments and developments, the snap connections are preferably designed as snap connections which are establishable without tools and which are re-connectable without tools.

The dyestuff is in particular a liquid dyestuff or a liquid which decomposes or damages the notes of value. The liquid dyestuff is also referred to as ink.

BRIEF DESCRIPTION OF THE DRAWINGS

The drawings described herein are for illustrative purposes only of selected embodiments and not all possible implementations, and are not intended to limit the scope of the present disclosure.

Further features and advantages of the disclosure result from the following description which explains the disclosure in more detail on the basis of embodiments in connection with the enclosed Figures.

Corresponding reference numerals indicate corresponding parts throughout the several views of the drawings.

DETAILED DESCRIPTION OF THE PREFERRED EMBODIMENTS

Example embodiments will now be described more fully with reference to the accompanying drawings.

Figure 1:
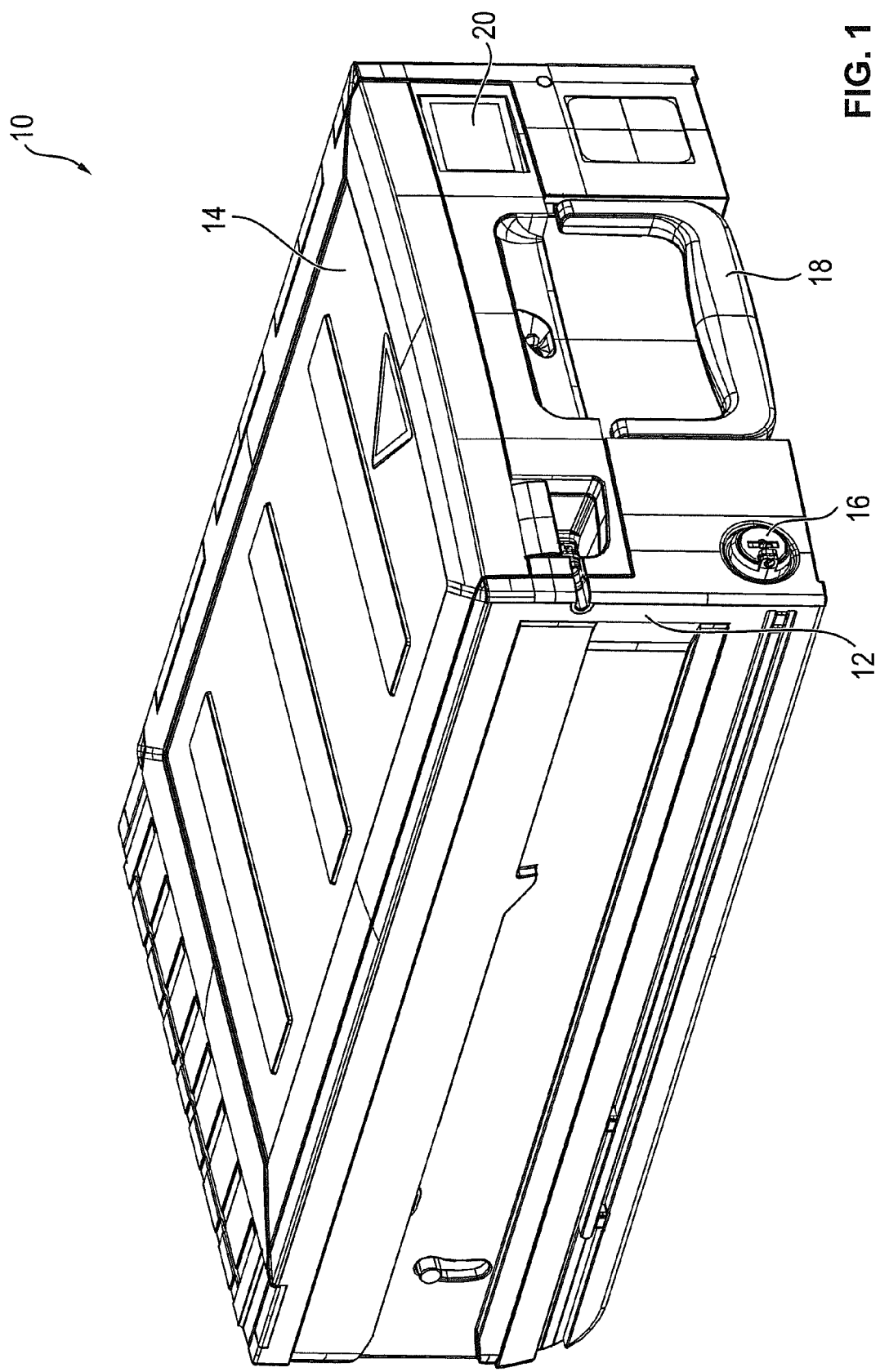
FIG. 1 shows a perspective illustration of a closed value note transport container.

FIG. 1 shows a perspective illustration of a value note transport container 10 which can serve as a recycling cassette and is insertable into a recycling automated teller machine for depositing and dispensing notes of value, into a cash deposit machine for depositing notes of value and into a cash dispensing machine for dispensing notes of value. Additionally or alternatively, the value note transport container 10 is insertable into automatic cash safes and into automatic cash register systems of the retail trade.

The value note transport container 10 has a basic body 12 and a cover 14 connected to the basic body 12 via hinges, said cover being lockable by means of a lock 16 in a closed position. The cover 14 is also unlockable by means of the lock 16 so that the cover 14 can be opened by means of the lock 16. As a result, access to a banknote receiving area provided in the value note transport container 10 and to further components arranged in the value note transport container 10 is possible. Further, the value note transport container 10 has a handle 18 which facilitates the carrying of the value note transport container 10 as well as a display unit 20 for displaying operating data and/or an electronic seal. In particular, the operating state of the value note transport container 10 can be displayed via the display unit 20. In other embodiments, the value note transport containers 10 have no display unit 20 and/or no handle 18.

In FIG. 1, the value note transport container 10 is illustrated in its mounted position in an automated teller machine or in its mounted position in another device for handling notes of value, the basic body 12 being arranged at the bottom and the cover 14 at the top. In this position shown, notes of value, in particular banknotes, can be stored as a value note stack in the value note transport container 10, the notes of value being arranged standing upright on one of their longitudinal sides.

Figure 2:
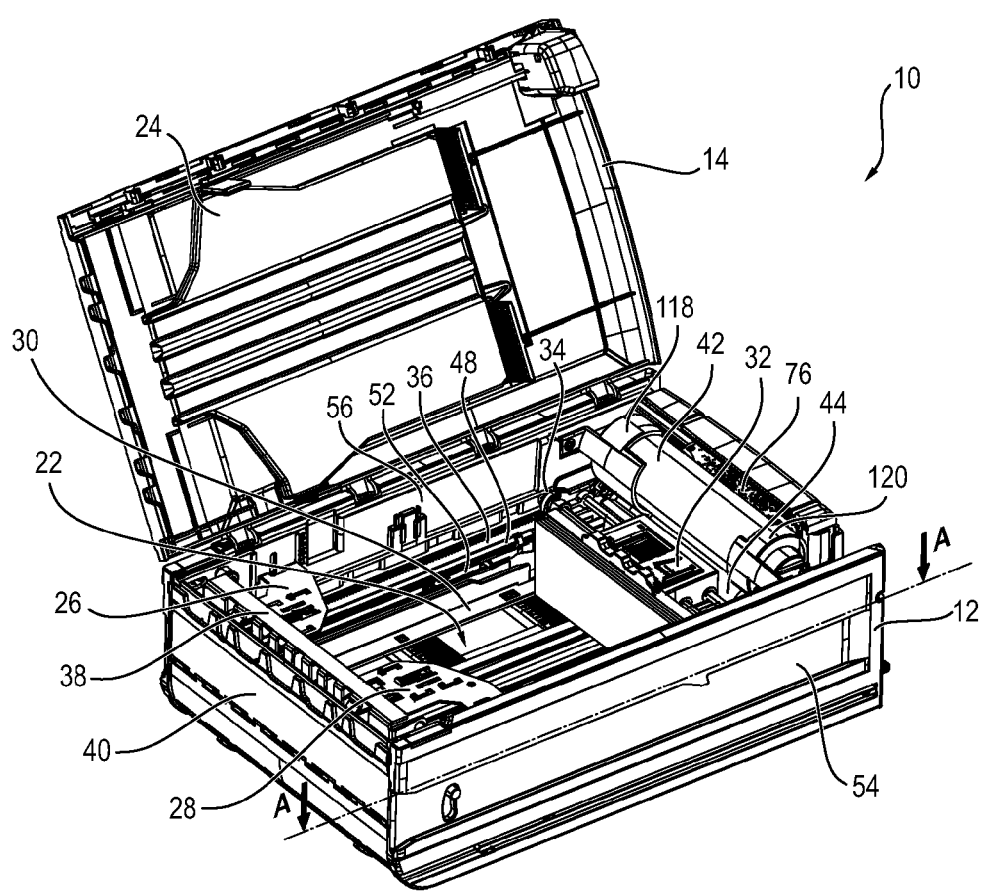
FIG. 2 shows a second perspective illustration of the value note transport container according to FIG. 1 with opened cover.

In FIG. 2, the value note transport container 10 according to FIG. 1 is shown in a further perspective illustration, the cover 14 being unlocked and opened in this illustration so that access to a number of components which are arranged inside the value note transport container 10 is possible. Through the opened cover 14, moreover access to the receiving area 22 provided by the value note transport container 10 for receiving notes of value is possible. This receiving area 22 can be limited in its size dependent on the size of the notes of value to be received by means of height limiting elements 24 to 28 and width limiting elements, of which one width limiting element 30 being visible in FIG. 2. Each of the limiting elements 24 to 30 is adjustable in a stepwise manner, as a result whereof the receiving area 22 is adaptable to the size of the notes of value to be received in the receiving area 22.

Further, inside the value note transport container 10 a press-on carriage 32 is provided, which has a drive motor (not illustrated) which drives driving gears 34 projecting from the press-on carriage 32 on both sides so that the press-on carriage 32 can be displaced along two toothed racks 36 arranged on the sidewalls 54, 56 of the value note transport container 10. By means of the press-on carriage 32, the receiving area 22 can be delimited and thus a stacking area suitable for the (not illustrated) value note stack received in the value note transport container 10 can be delimited. In FIG. 2, the press-on carriage 32 is shown in its rear end position in which a maximum stacking area is provided so that in this position of the press-on carriage 32 the stacking area corresponds to the receiving area 22. Further, the value note transport container 10 comprises a value note retracting flap 38 with which a banknote stack present in the stacking area 22 is pressed further into the receiving area 22 when the value note transport container 10 is removed from a corresponding device for handling notes of value. As a result, the notes of value are safely held in the receiving area 22 also during transport of the value note transport container 10.

Further, a closing unit 40 designed as a roller shutter is provided which can automatically be unlocked and opened when the value note transport container 10 is inserted into a device for handling notes of value. By appropriate locking elements, the roller shutter 40 can be closed and locked after the value note transport container 10 has been removed from a device for handling notes of value, wherein manipulation sensors known per se are provided which, for example, detect a manipulation of the roller shutter 40 and/or of the cover 14 and/or of the lock 16 and in the case of a detection of an unauthorized manipulation attempt in at least one preset operating mode of the value note transport container 10 activate an ink kit integrated in the value note transport container 10 by which the notes of value stored as a stack in the receiving area 22 are inked with a dyestuff of the ink kit and are thus invalidated. In this way, thefts are stopped from commercially using stolen notes of value because these have been invalidated by means of the dyestuff.

In the present embodiment, the ink kit comprises a first dyestuff and trigger module 42 as well as a first spray pipe 46 (FIG. 3) which is connected to a first container sidewall 54 by means of a first holding rail 50. Further, the ink kit comprises a second dyestuff and trigger module 44. An outlet area of the second dyestuff and trigger module 44 is connected to a second spray pipe 48 which is mounted to a second sidewall 56 opposite to the first sidewall 54 via a second holding rail 52. The spray pipes 46, 48 each have several outlet openings along opposite sides of the receiving area 22 which are directed towards the receiving area 22 so that the dyestuff exiting from these outlet openings of the spray pipes 46, 48 is discharged onto the notes of value of a value note stack arranged in the receiving area 22 when the dyestuff and trigger modules 42, 44 are activated.

Figure 3:
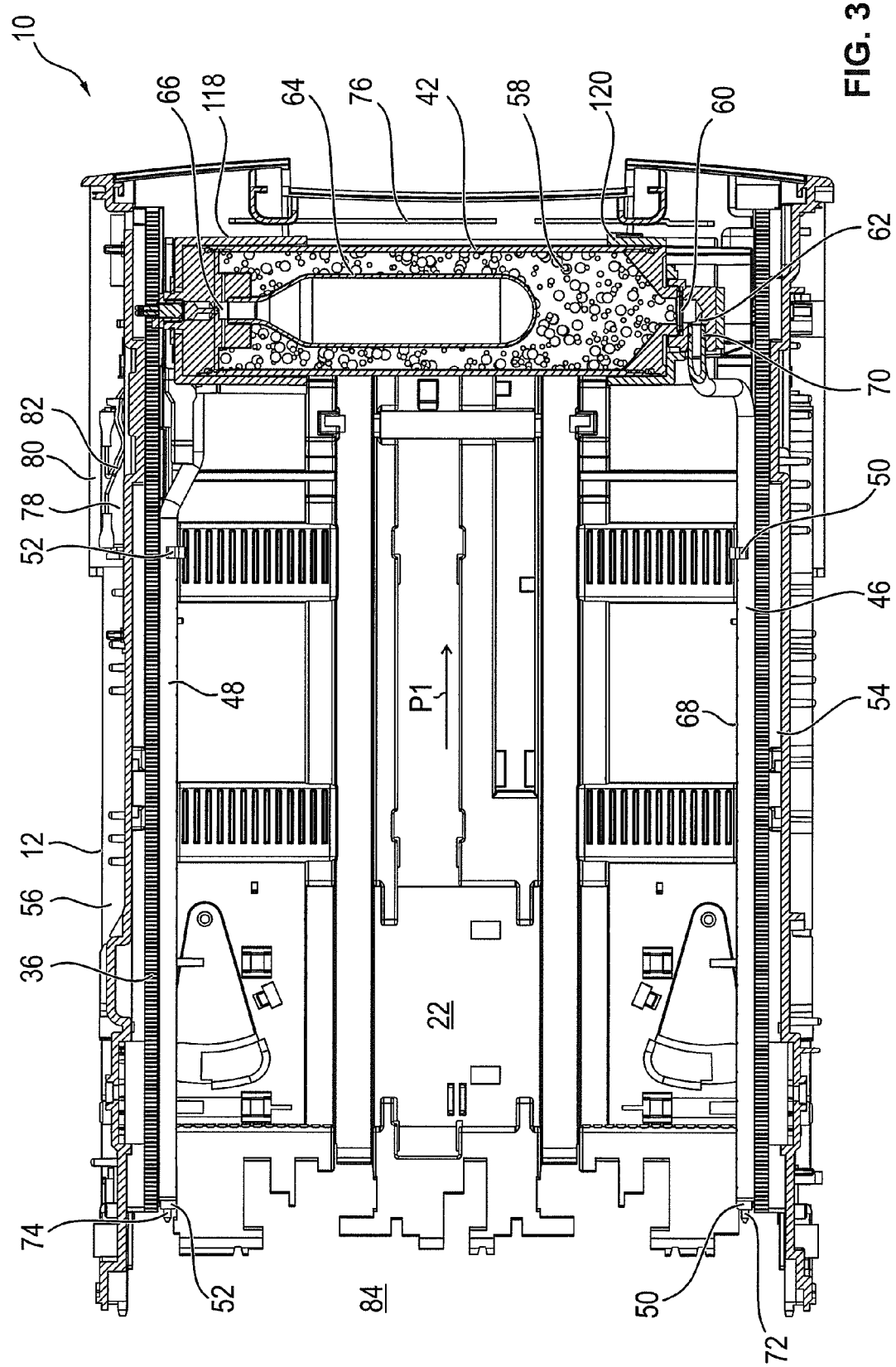
FIG. 3 is a sectional view of the value note transport container according to FIGS. 1 and 2 along the cutting plane A-A according to FIG. 2 as a top view.

FIG. 3 is a sectional view of the value note transport container 10 along the horizontal cutting plane indicated in FIG. 2 as a top view. For more clarity, in FIG. 3 a large number of elements are omitted as compared to FIG. 2. In accordance with the cutting plane A-A, the first dyestuff and trigger module 42 is illustrated in the form of a sectional view. The first dyestuff and trigger module 42 has a dyestuff receiving area 58 which is closed against an outlet area 62 of the first dyestuff and trigger module 42 by means of a bursting disk 60. Further, the dyestuff and trigger module 42 comprises a pressure container 64 which is arranged inside the first dyestuff and trigger module 42 and which is located in the dyestuff receiving area 58. The pressure container 64 contains a pressurized gas or a liquid to be vaporized into a gas when opening the pressure container 64, in particular gaseous $CO_2$ or liquid $CO_2$.

The pressure container 64 is closed by means of a closing arrangement 66 which can be controlled by a control unit for opening the closing arrangement 66 so that the gas escapes from the pressure container 64 into the dyestuff receiving area 58 and increases the pressure in the dyestuff receiving area 58 such that the bursting disk 60 bursts and the dyestuff is pressed from the dyestuff receiving area 58 into the first spray pipe 56 and exits from the openings provided in the spray pipe 56 and is discharged into the receiving area 22. One of the openings of the first spray pipe 46 is exemplarily identified with the reference sign 68. One end of the first spray pipe 46 is plugged into the outlet area 62 of the first dyestuff and trigger module 42 and sealed in the outlet area 62 via a seal 70 formed as an O-ring. The opposite end of the spray pipe 46 is closed in a dyestuff-tight manner by a closing element 72 so that the dyestuff pressed into the spray pipe 46 by means of the dyestuff and trigger module 42 can only exit through the openings 68 in the spray pipe 46.

The first dyestuff and trigger module 42 and the second dyestuff and trigger module 44 are identically constructed and are arranged on top of one another in the operating position of the value note transport container 10, the outlet area 62 of the first dyestuff and trigger module 42 being arranged at the end of the first dyestuff and trigger module 42 facing the first sidewall and an outlet area of the second dyestuff and trigger module 44 being arranged at the end of the second dyestuff and trigger module 44 facing the second sidewall 56. One end of the second spray pipe 48 is inserted into the outlet area of the second dyestuff and trigger module 44 in the same manner as already described for the first spray pipe 46. The second spray pipe 48, too, is arranged in the outlet area in a dyestuff-tight manner by means of a seal formed as an O-ring. The opposite end of the second spray pipe 48 is closed by a second closing element 74.

The control unit for evaluating the sensor signals of non-illustrated manipulation sensors for the detection of manipulation attempts as well as for the optional setting of the operating mode of the value note transport container 10 is integrated into the value note transport container 10, a board 76 of the control unit being illustrated in FIG. 3. Further, the power supply for providing the supply voltage of the control unit 76 as well as for providing the energy for activating the opening of the closing arrangement 66 of the first dyestuff and trigger module 44 as well as an identically constructed closing arrangement of the second dyestuff and trigger module 44 is provided by means of a battery 78. The battery 78 is arranged in a battery compartment 80 that is integrated into the second sidewall 56. The battery 78 has a connecting cable 82 firmly connected to the battery 78. The other end of the connecting cable 82 is connected to a further non-illustrated board via an electric plug connector. This board and the board 76 are designed as printed circuits on which corresponding components are arranged in order to provide the required electric connections as well as the required control and storage functions. The notes of value are supplied to the receiving area 22 in the section 84 when the roller shutter 40 is opened and are pushed in in the stacking direction indicated by the arrow P1 when further notes of value are supplied. Further, the first dyestuff and trigger module 42 and the second dyestuff and trigger module 44 are arranged on top of one another, the longitudinal axes 86 of the dyestuff and trigger modules 42, 44 lying in a plane to which the stacking direction P1 is a normal. As a result, a space-saving arrangement of the dyestuff and trigger modules 42, 44 in the value note transport container 10 behind the receiving area 22 as viewed in stacking direction P1 is possible. Further, the dyestuff and trigger modules 42, 44 have a cylindrical basic shape in the present embodiment. In other embodiments, the dyestuff and trigger modules 42, 44 have other basic shapes, in particular square or rectangular cross-sections.

Figure 4:
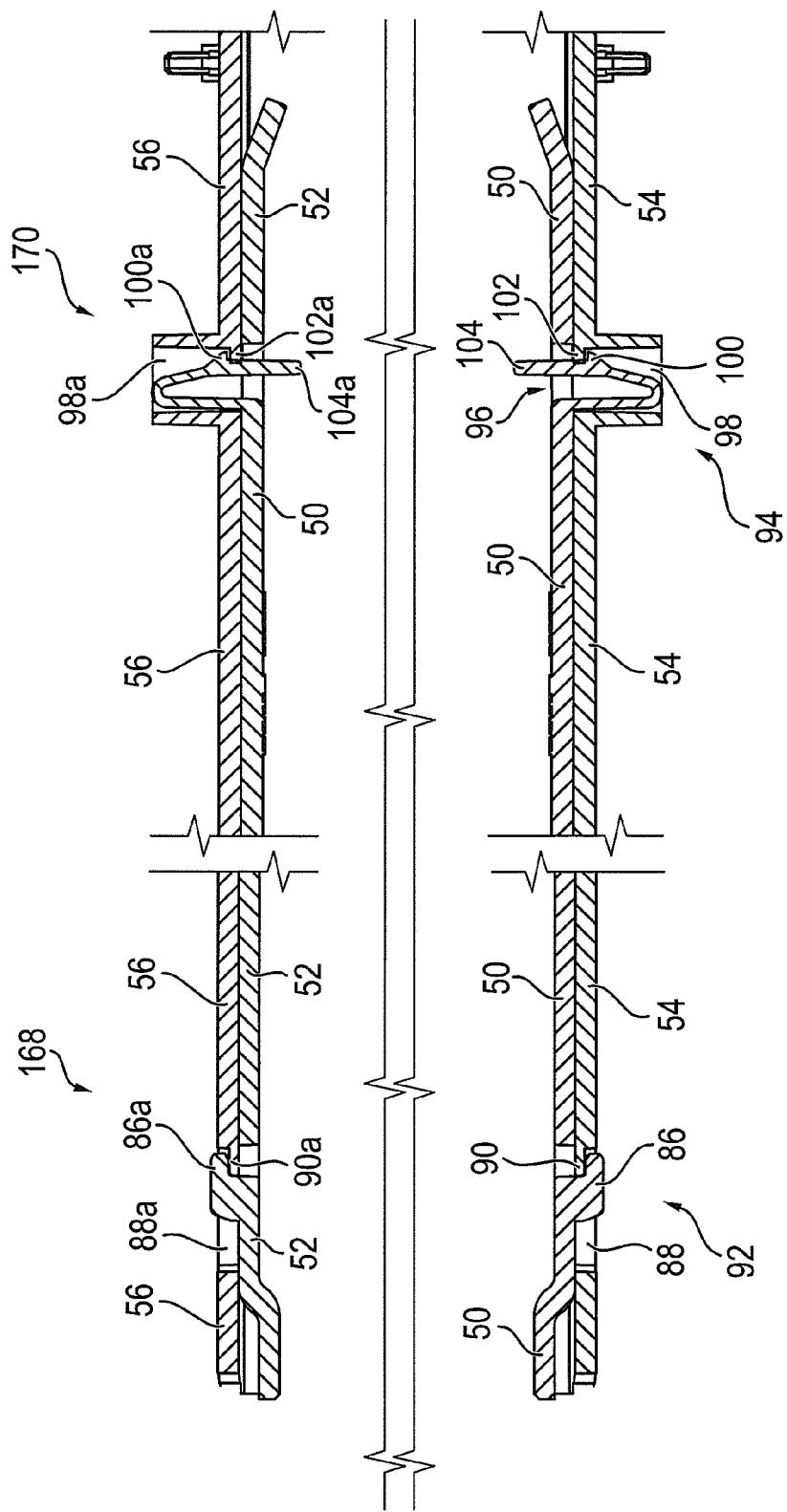
FIG. 4 is a sectional view of details of the value note transport container together with sections of an adapter rail for connecting a spray pipe for distributing dyestuff.

FIG. 4 is a sectional view of sections of the first holding rail 50 and of details of the first sidewall 54 along the longitudinal axis of the first holding rail 50 as well as a sectional view of sections of the second holding rail 52 and of details of the second sidewall 56 along the longitudinal axis of the second holding rail 52.

The holding rail 50 has a hook-shaped engaging element 86 which has been inserted through an opening 88 formed in the sidewall 54 and has been moved in an insertion direction P2 parallel to the stacking direction P1 so that the hook-shaped element 86 engages behind an area 90 of the sidewall 54. The opening 88, the hook-shaped engagement element 86 and the area 90 form a first connecting area 92 between the first holding rail 50 and the first sidewall 54. In a second connecting area 94 between the first holding rail 50 and the sidewall 54 a snap connection is formed, in the first holding rail 50 a wing element 96 being formed which is elastically deformed when the wing element 96 is inserted into an opening 98 provided in the sidewall 54, a projection 100 provided at the wing element 96 being pushed behind a projection 102 formed in the sidewall 54 by the restoring force caused by the elastic deformation and snaps therein. By means of a projecting part 104, the wing element 96 can again be deformed such that the projections 100, 102 are no longer engaged so that the wing element 96 can be pulled out of the opening 98 and the first holding rail 50 can be lifted from the sidewall 54. Thus, a tool-free connection between the first holding rail 50 and the sidewall 54 of the value note transport container 10 is possible. In the same manner as explained for the first holding rail 50, the second holding rail 52 is connectable to the second sidewall 56, the arrangement then being mirror-inverted and elements having the same structure and/or the same function being identified with the same reference signs and the added letter a.

Figure 5:
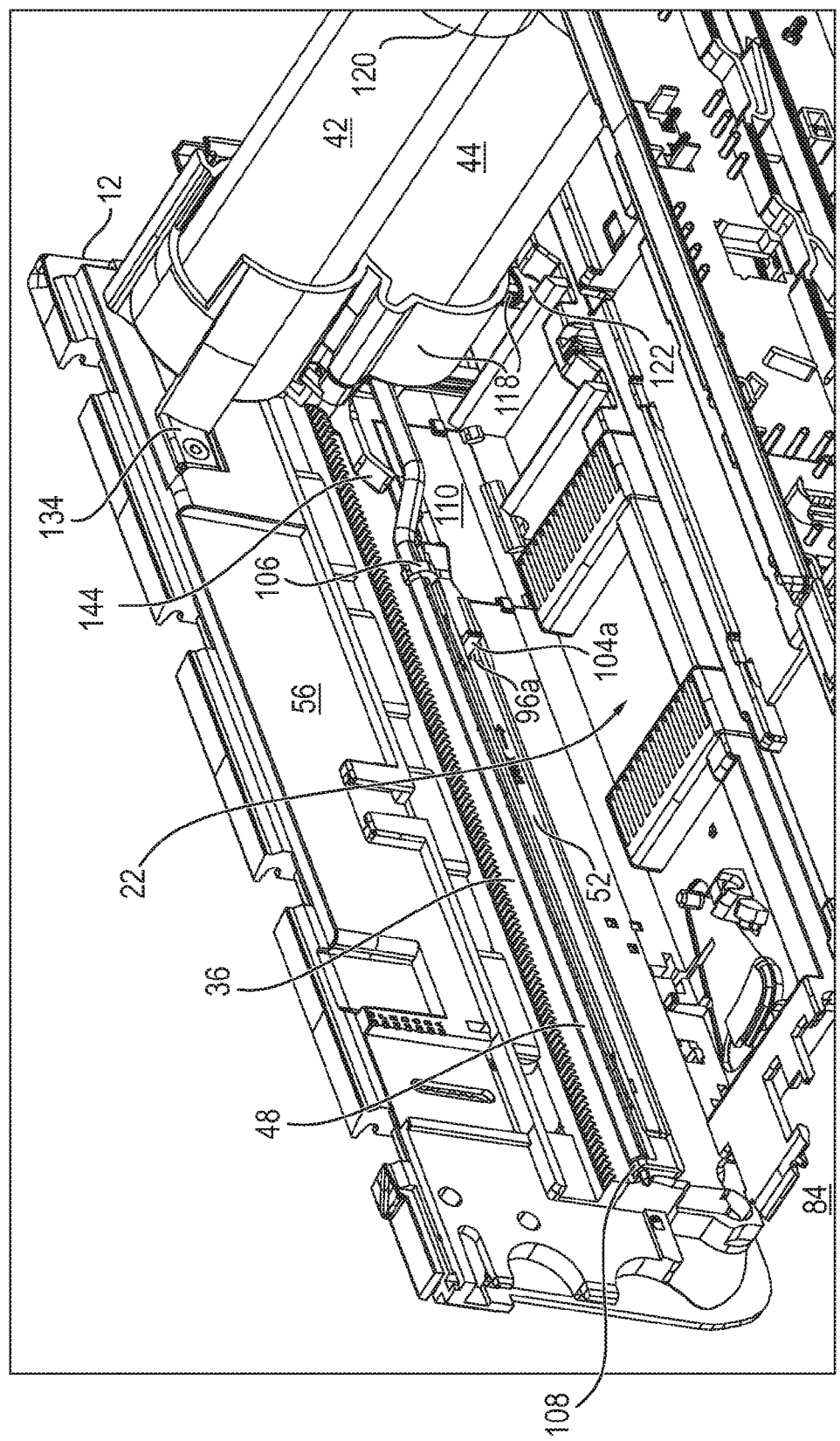
FIG. 5 is a perspective illustration of a detail of a basic body of the value note transport container according to FIGS. 1 to 4, wherein for a better visibility of components of a device for invalidating notes of values arranged in the value note transport container, which device is integrated into the value note transport container and is referred to as an ink kit, a number of further elements of the value note transport container are omitted in this illustration.

In FIG. 5, a perspective illustration of a detail of the basic body 12 of the value note transport container 14 is illustrated, only the elements illustrated in FIG. 3 being shown. As shown in FIG. 5, a first c-shaped or u-shaped connecting element 106 encloses a portion of the second spray pipe 48 and a second c-shaped or u-shaped connecting element 108 encloses a portion of the closing element 74 so that the second spray pipe 48 is held in a desired position on the sidewall 54 by means the second holding rail 52. The holding rails 50, 52 are, as already explained in connection with FIG. 4, easily connectable to the respective sidewall 54, 56 without tools and are disconnectable therefrom in that a projecting part 104, 104a of a wing element 96, 96a of the holding rails 50, 52 is actuated. Further, a battery compartment cover 110 for closing the battery compartment 80 formed in the sidewall 56 is illustrated in FIG. 5.

Figure 6:
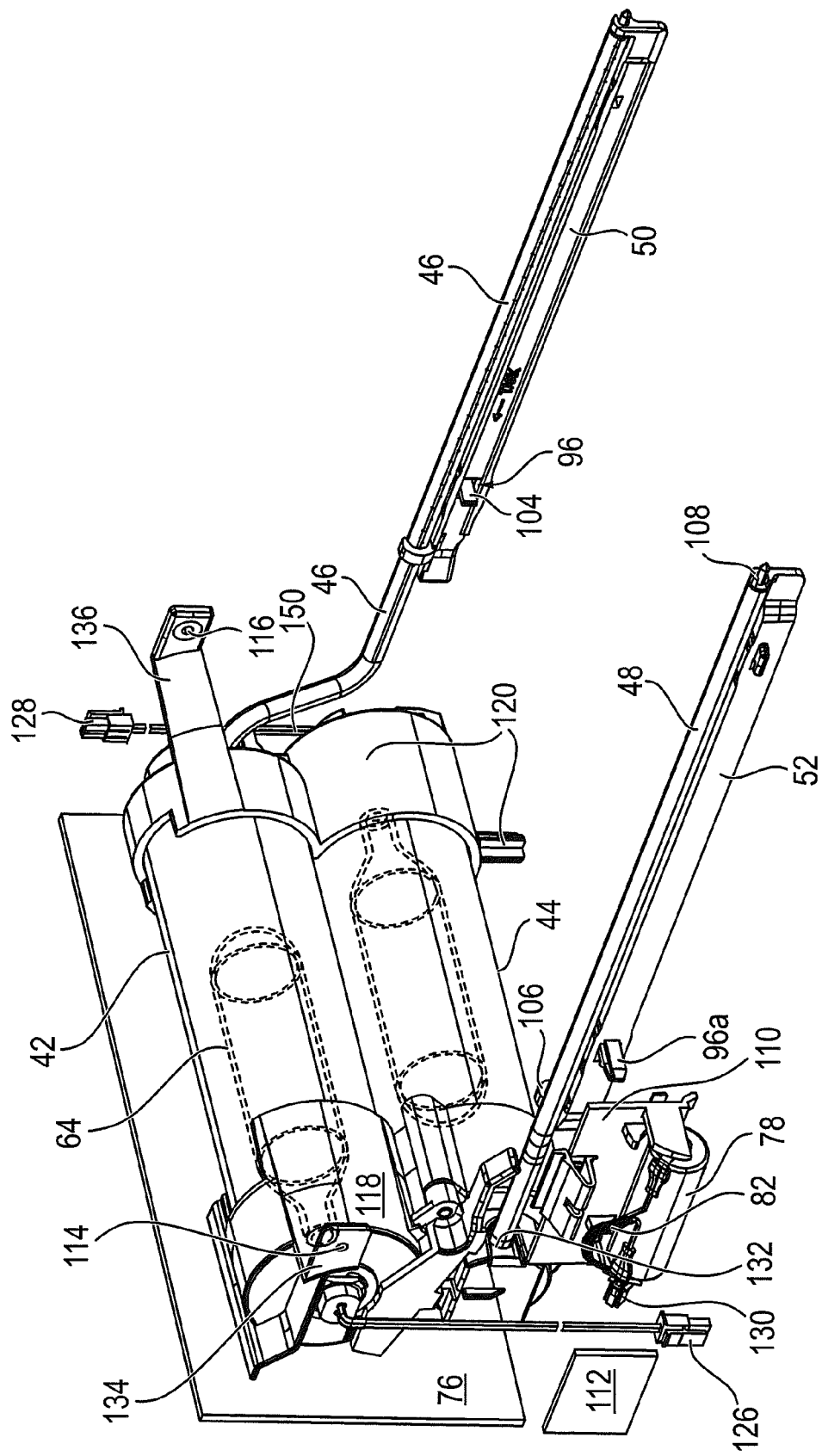
FIG. 6 is a perspective illustration of the components of the ink kit integrated into the value note transport container.

In FIG. 6, the components of the device arranged in the value note transport container for invalidating notes of value arranged in the value note transport container, i.e. the components of the ink kit are shown. Except for the boards 76, 112 designed as printed circuits, all other illustrated components are handled by a technically trained person during maintenance of the ink kit. For a removal of the ink kit the projecting parts 104, 104a of the wing elements 96, 96a of the holding rails 50, 52 are disconnected and the holding rails 50, 52 are removed. Subsequently, two locking elements inserted into the container sidewalls 54, 56 through the openings 114, 116 are removed and the dyestuff and trigger modules 42, 44 combined to one unit are pulled upwards out of the basic body 12 of the value note transport container 10 together with the spray pipes 46, 48 connected to this unit, the connecting element 118 being pulled out of the connecting element 122 formed in the container bottom complementarily to the connecting element 118. At the same time, the connecting element 120 is pulled out of a complementary connecting element formed in the container bottom. Subsequently, the firing cable connecting plugs 126, 128 are unplugged from complementary plug connectors of the board 76 so that the dyestuff and trigger modules 42, 44 can be removed together with the connecting elements 118, 120 and the spray pipes 46, 48 from the value note transport container 10. Thereafter, the battery compartment cover 110 can be opened and the battery 78 can be removed from the battery compartment 80. Subsequently, a plug connector 130 mounted at the end of the connecting cable 82 is unplugged from the board 112 so that the battery 78 can be removed from the value note transport container 10. Thereafter, a new battery 78 is inserted into the battery compartment 80. Subsequently, the plug connector of the connecting cable 82 is connected to a complementary plug connector of the board 112. After insertion and connection of the battery 78, the battery compartment cover 110 is again closed.

Subsequently, the spray pipe 48 is pulled out of the receiving area 132 and the first spray pipe 46 is pulled out of the outlet area 62. The remaining unit comprised of the dyestuff and trigger modules 42, 44 and the connecting elements 118, 120 is replaced by a new identical unit, the first spray pipe 46 being inserted into the outlet area 62 of the first dyestuff and trigger module 42 and the second spray pipe 48 being inserted into the outlet area 132 of the second dyestuff and trigger module 44 of the new unit. Thereafter, the unit so formed is inserted into the value note transport container 10, the projecting contacting areas of the connecting elements 118, 120 being inserted into the complementary areas of the connecting elements 122 in the container bottom. Further, the supporting areas 134, 136, in which the openings 114, 116 are formed, are received in complementary receiving areas formed in the sidewalls 54, 56 so that plug connections between the connecting elements 118, 120 of the dyestuff and trigger modules 42, 44 and the complementary connecting elements 122 of the value note transport container 10 are established in an easy manner. Then, the plug connectors 126, 128 of the firing cables of the dyestuff and trigger modules 42, 44 are connected to the complementary plug connectors of the board 76. Finally, the spray pipes 46, 48 are mounted to the sidewalls 54, 56 of the value note transport container 10 by means of the holding rails 50, 52.

Figure 7:
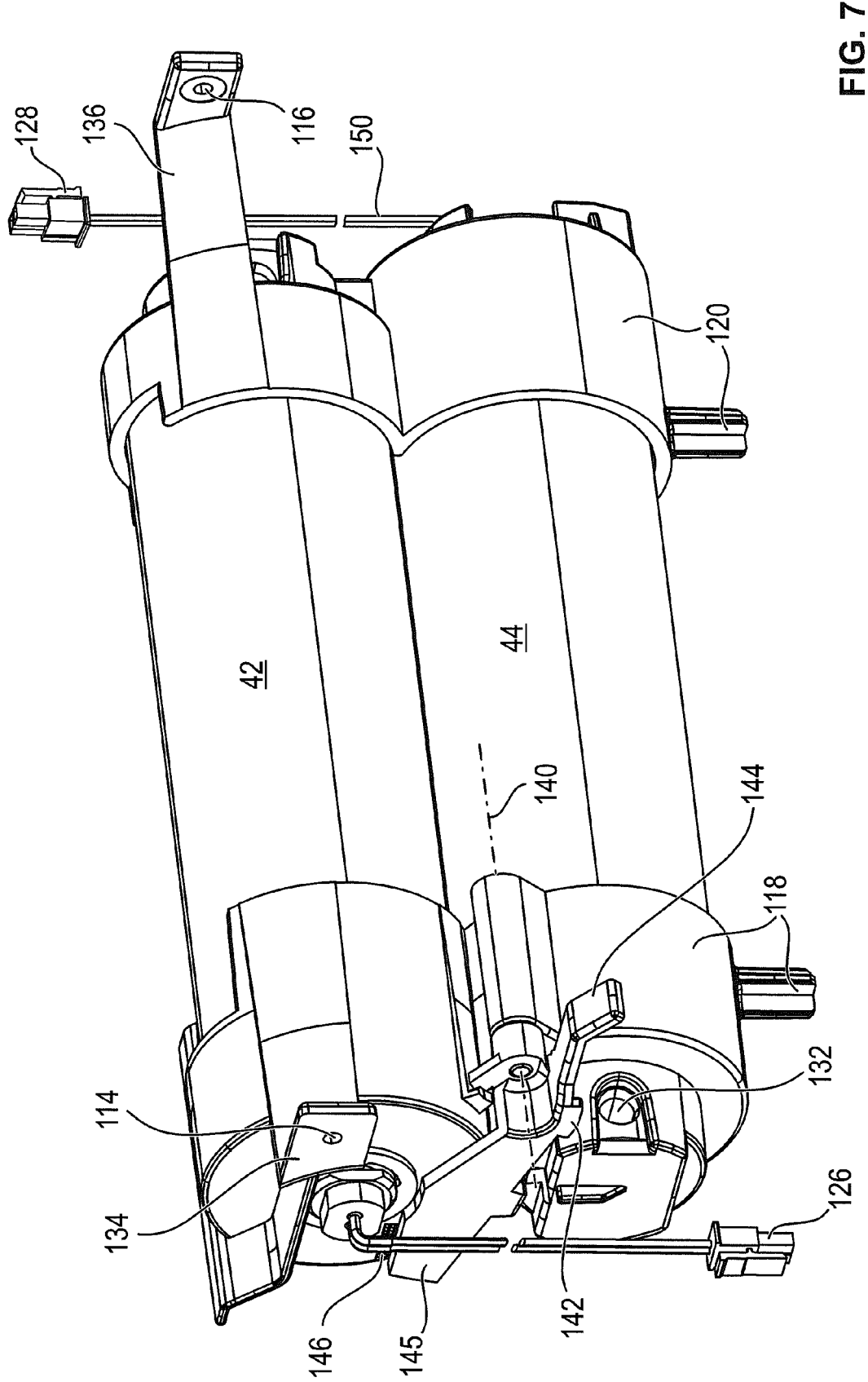
FIG. 7 is a perspective illustration of a unit of the ink kit comprising two dyestuff and trigger modules with a device for detecting the end position of a press-on carriage delimiting a stacking area for stacking the notes of value.

In FIG. 7, an enlarged perspective illustration of the unit of the ink kit comprising two dyestuff and trigger modules 42, 44 is shown, in this illustration a switch lug 142 pivotable about an axis of rotation 140 being shown, which is pivoted when the press-on carriage 32 has reached its rear position shown in FIG. 2. In this position, the press-on carriage 32 has been moved against the contact area 144 of the switch lug 142 so that the switch lug 142 is pivoted about the axis of rotation 140. As a result, a light-reflecting area 145 of the switch lug 142 is pivoted in front of a light-absorbing area 146 formed on the connecting element 118 so that a reflecting light barrier directed onto the light-absorbing area 146 emits light onto the light-reflecting area 145 of the switch lug 142 after pivoting the switch lug 142 and detects the reflected light so that, as a result, by means of this light barrier the end position of the press-on carriage 32 is detectable.

Figure 8:
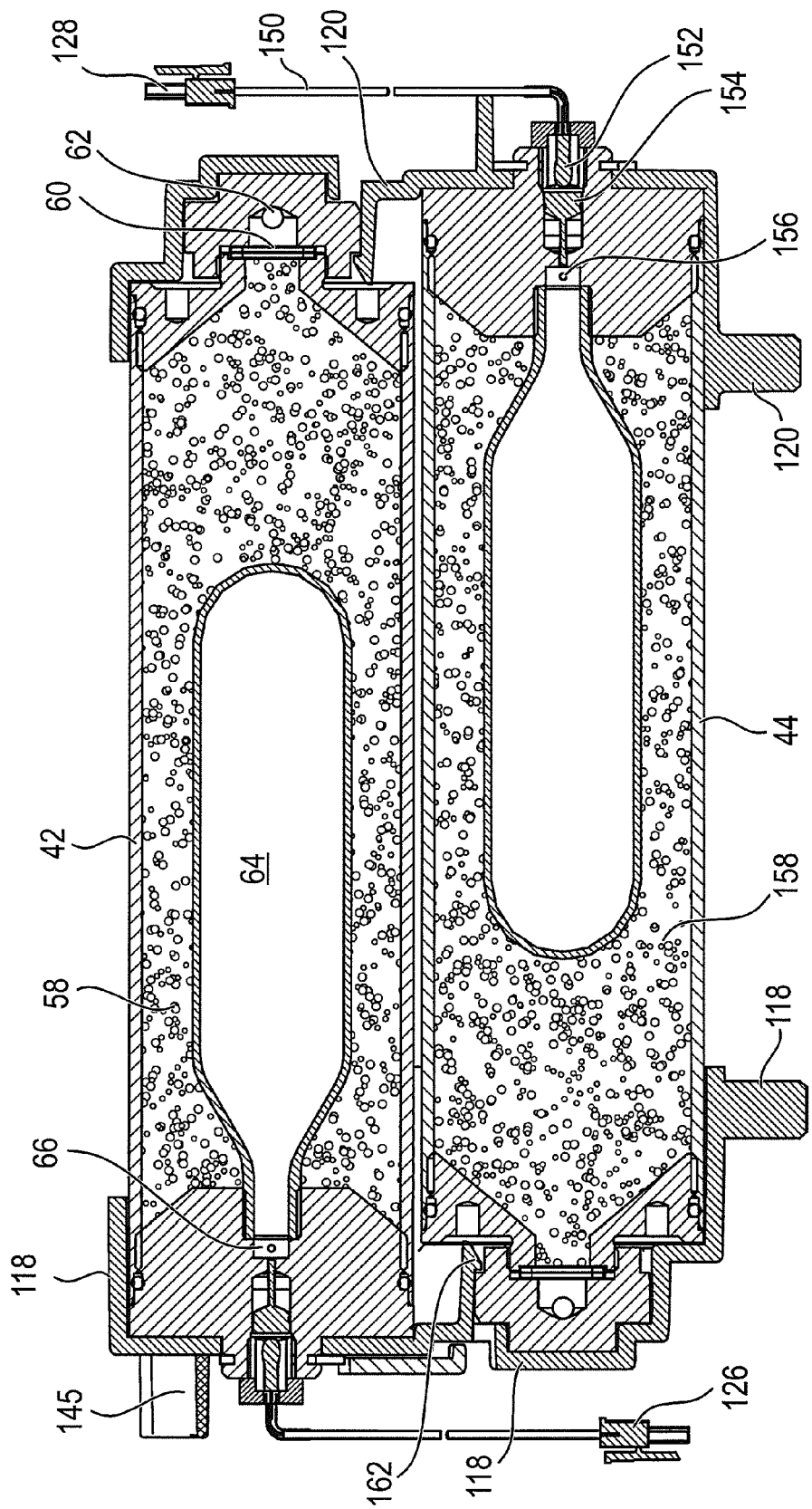
FIG. 8 is a sectional view of the unit according to FIG. 7.

In FIG. 8, a sectional view of a detail of the unit according to FIG. 7 is illustrated. In this sectional view, also the pressure container 148 of the second dyestuff and trigger module containing the trigger gas is illustrated. A firing cable 150 connected to the firing cable connecting plug 128 is inserted into a blasting cap 152 which is triggerable by means of an appropriate control impulse that is transmitted from the control unit via the firing cable 150 to the blasting cap 152. By triggering the blasting cap 152, a firing pin 154 is pushed through a closed opening of the pressure container 148, as a result whereof said pressure container is opened so that the compressed gas in the pressure container 148 reaches the dyestuff receiving area 158 via the exit opening 156 and presses the dyestuff present therein into the second spray pipe 48 and further through its outlet openings 68 into the receiving area 22.

Figure 9:
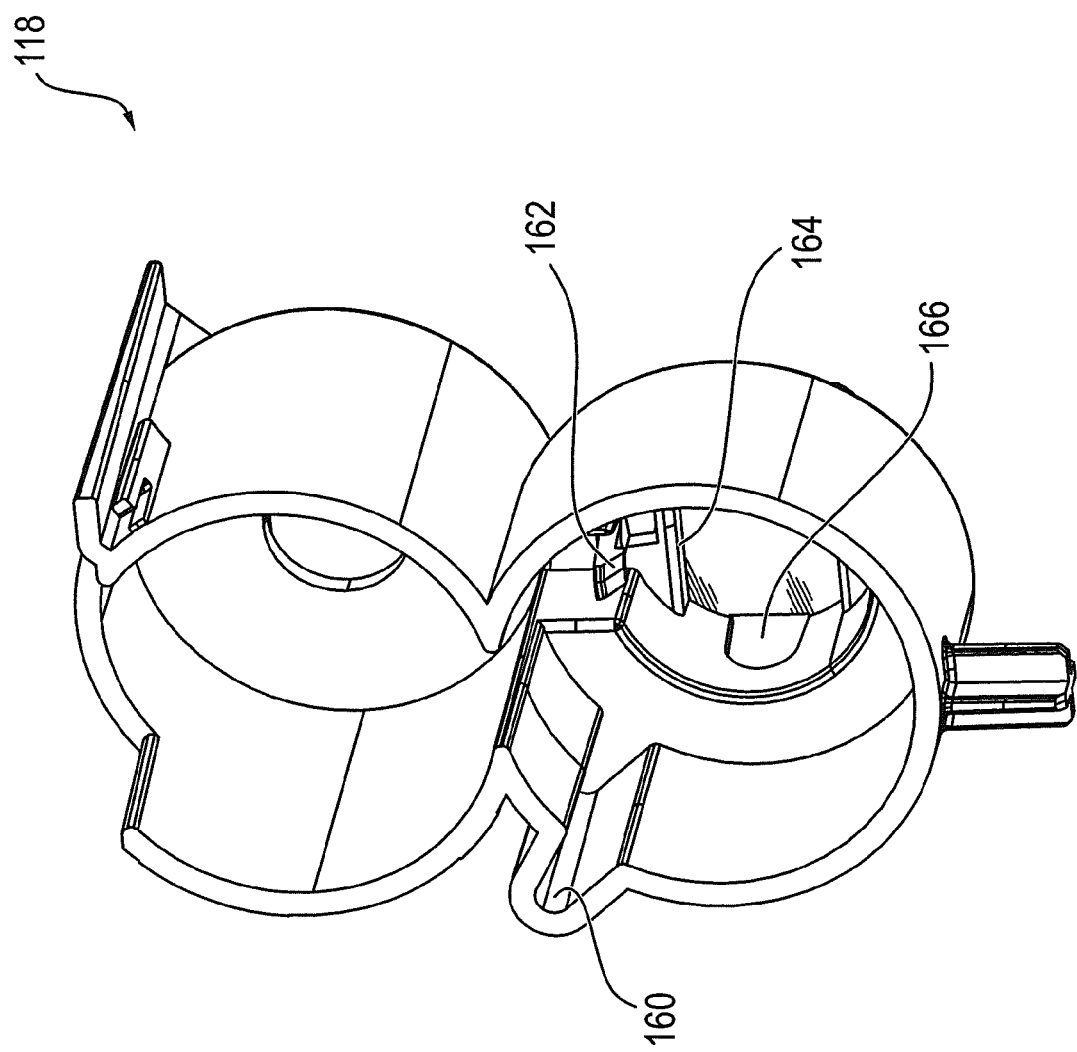
FIG. 9 is a perspective illustration of a connecting element for connecting one respective side of each of the two dyestuff and trigger modules together to form one unit and for establishing a plug connection to the basic body of the value note transport container.

In FIG. 9, the connecting element 118 for connecting one respective side of the two dyestuff and trigger modules 42, 44 is illustrated, and a storage area 160 for receiving the pivotable switch lug 142 is visible. Further, in the receiving area for the end of the second dyestuff and trigger module 44 a snap nose 142 for establishing a snap connection between the connecting element 118 and the second dyestuff and trigger module 44 is shown. Further, a projection 164 is present which engages with a complementarily formed area of the second dyestuff and trigger module 44 so that by the projection 164 and the complementarily formed area a lock against rotation exists between the connecting element 118 and the dyestuff and trigger module 44. Further, in the connecting element 118 an opening 166 is formed through which the second spray pipe 48 can be passed in order to be inserted into the outlet area 132 of the second dyestuff and trigger module 44.

Figure 10:
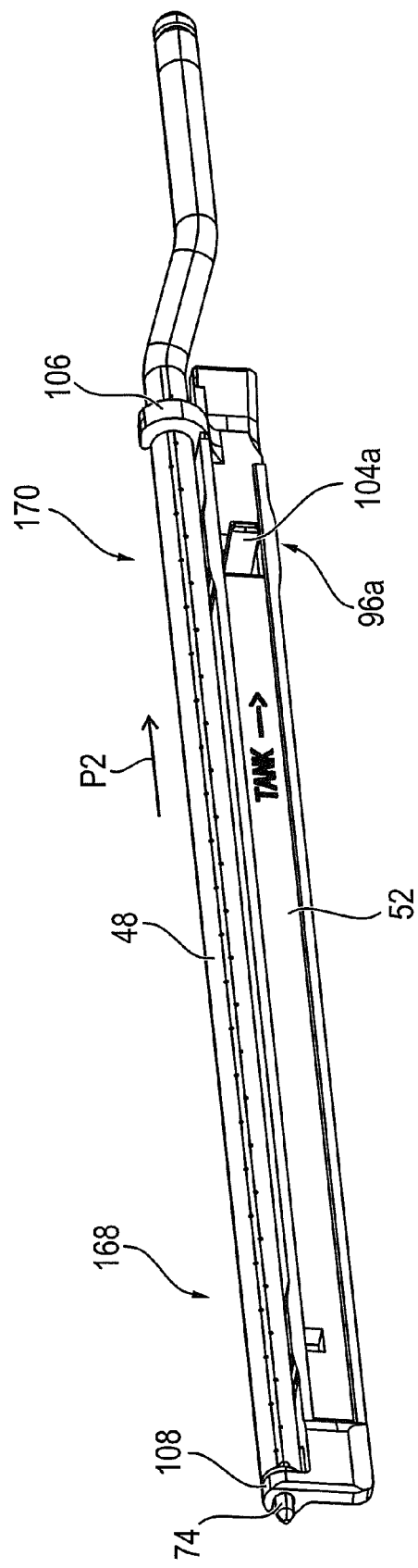
FIG. 10 is a perspective illustration of the front side of an arrangement having a spray pipe for distributing the dyestuff onto the notes of value present in the receiving area of the value note transport container and with an adapter rail for connecting the spray pipe to the basic body of the value note transport container.

In FIG. 10, a first perspective illustration of the second spray pipe 48 together with the second holding rail 52 is illustrated, the direction of movement for establishing the connection between the second holding rail 52 and the container wall 56 in the first connecting area 168 being indicated by the arrow P2. In the second connecting area 170, the connection between the holding rail 52 and the second sidewall 56 is established via a snap connection in the same manner as described in detail in connection with FIG. 4 for the first holding rail 50 with the first sidewall 54.

Figure 11:
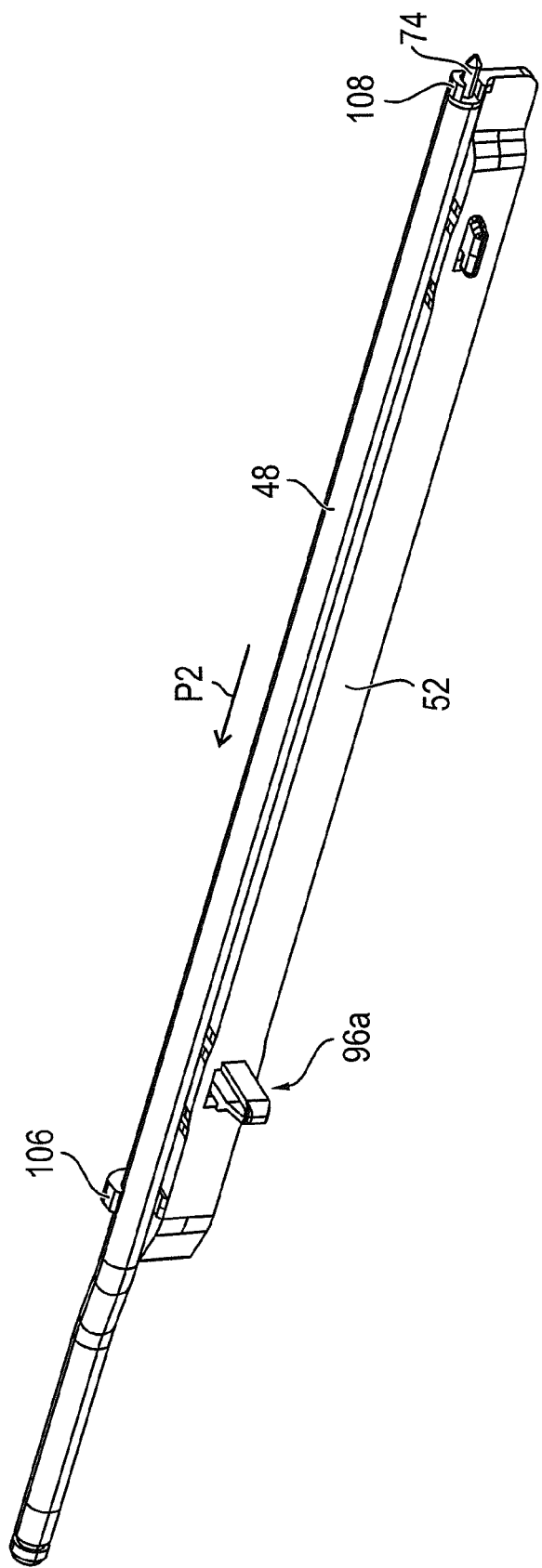
FIG. 11 is a perspective illustration of the rear side of the arrangement according to FIG. 10.

In FIG. 11, a further perspective illustration of the rear side of the arrangement according to FIG. 10 comprising the second spray pipe 48 and the second holding rail 52 is shown.

Figure 12:
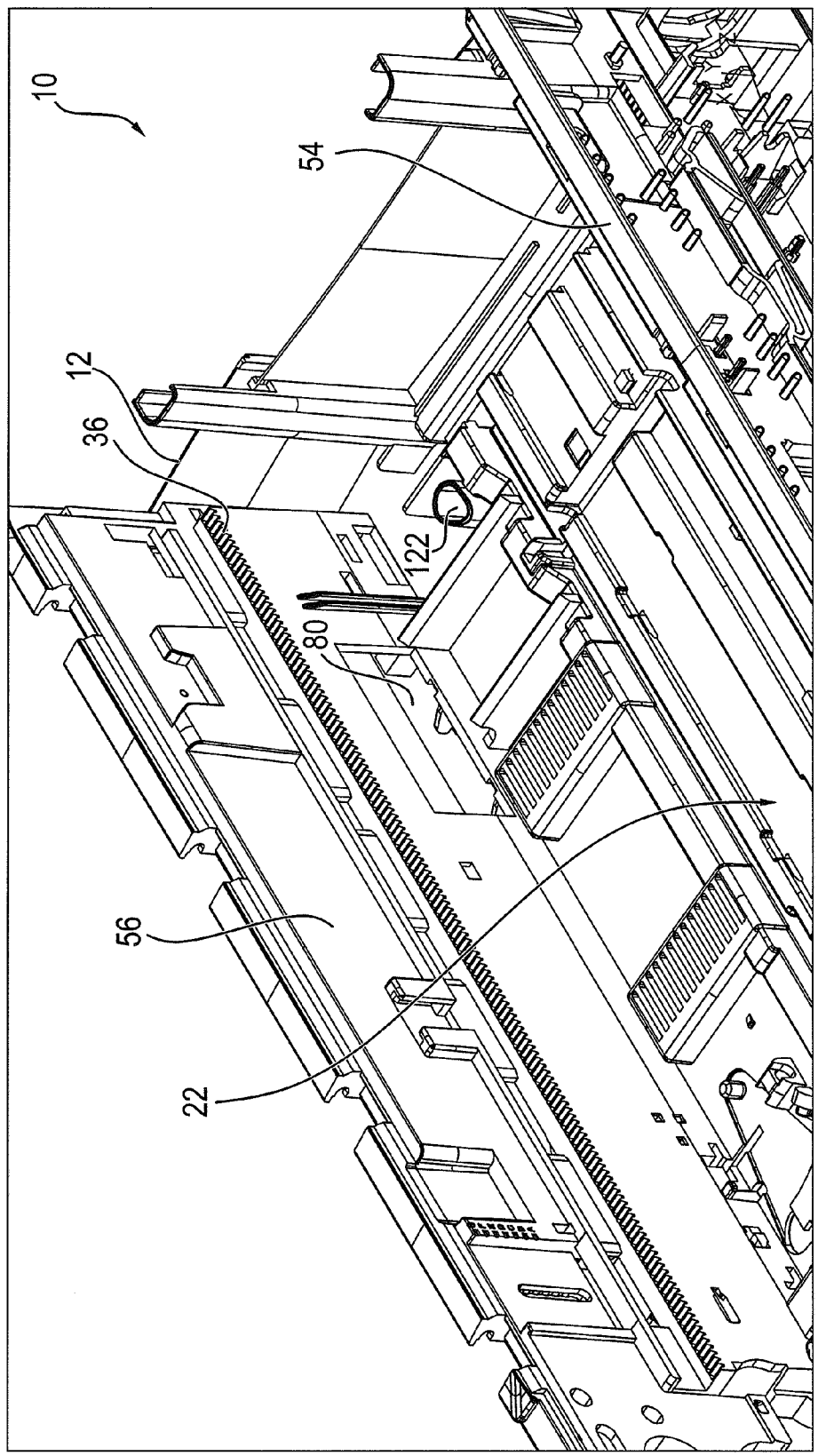
FIG. 12 is a perspective illustration of a detail of the basic body of the value note transport container without the components of the ink kit.

FIG. 12 shows a detail of the basic body 12 of the value note transport container 10 without the components of the ink kit.

In other embodiments, the contact areas of the connecting elements for connecting the dyestuff and trigger modules 42, 44 to the value note transport container 10 can have a different shape, in particular also a substantially rectangular cross-section or a trapezoidal cross-section.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A device for invalidating notes of value, comprising:
two combined dyestuff and trigger modules, the two combined dyestuff and trigger modules are independent from one another and are connectable via at least one first connecting element to a second connecting element of a value note transport container that is complementary to the first connecting element, each dyestuff and trigger module comprising a pressure container arranged inside a dyestuff receiving area of each respective dyestuff and trigger module and a closing arrangement controllable by a control unit for opening the closing arrangement so that gas escapes from the pressure container into the dyestuff receiving area to release dyestuff out of the dyestuff and trigger modules respectively;
a first coupling member coupled to a first sidewall of the value note transport container; the first coupling member comprising a first and second recessed area each receiving and directly coupling to a first end of a different one of the two combined dyestuff and trigger modules to mount the two combined dyestuff and trigger modules adjacent a receiving area of the value note transport container that is configured to receive notes of value, the first end of each of the two combined dyestuff and trigger modules recessed within the first and second recessed areas respectively such that a portion of a cylindrical outer surface of each dyestuff and trigger module is covered by the first coupling member;
a second coupling member coupled to a second sidewall of the value note transport container that is opposite to the first sidewall, the second coupling member comprising a third and fourth recessed area each receiving and directly coupling to a second end of a different one of the two combined dyestuff and trigger modules to mount the two combined dyestuff and trigger modules adjacent a receiving area of the value note transport container that is configured to receive notes of value; the second end of each of the two combined dyestuff and trigger modules recessed within the third and fourth recessed areas respectively such that a second portion of the cylindrical outer surface of each dyestuff and trigger module is covered by the second coupling member;
wherein the two dyestuff and trigger modules are arranged next to one another such that longitudinal axes of the two dyestuff and trigger modules are separate and parallel;
two dyestuff distributing units, each one of which is connectable to an outlet area of a different one of the two dyestuff and trigger modules for distributing dyestuff exiting the dyestuff and trigger modules onto the notes of value; wherein:

the first connecting element is configured to establish a disconnectable plug connection with the second connecting element;

the two combined dyestuff and trigger modules are configured to be simultaneously housed within the value note transport container adjacent to the receiving area; and the two combined dyestuff and trigger modules are configured to be individually activated to release dyestuff into the receiving area.

2. The device according to claim 1, wherein each one of the two dyestuff distributing units includes at least one spray pipe having several exit openings for the exit of the dyestuff supplied to the spray pipe, through which openings the dyestuff reaches the notes of value present in the value note transport container.

3. The device according to claim 1, wherein the two dyestuff and trigger modules are controllable by the common control unit.

4. The device according to claim 1, wherein the two dyestuff and trigger modules are combined to one unit, the unit being connectable to the value note transport container via the disconnectable plug connection between the first connecting element and the second connecting element of the value note transport container.

5. The device of claim 1, wherein the longitudinal axes extend in a plane orthogonal to a stacking direction of a value note stack arranged in the value note transport container.

6. The device according to claim 1, wherein the two dyestuff and trigger modules are identically constructed.

7. The device according to claim 1, wherein the exit openings of the two dyestuff and trigger modules are arranged on opposite sides.

8. The device of claim 1, wherein the receiving area is accessible via an access opening closable by a closing element and the device has a battery for power supply to at least one of the control unit and a trigger unit of the two dyestuff and trigger modules which is only accessible when the access opening is opened.

9. The device of claim 8, wherein a battery compartment accessible when the access opening is opened is provided, the battery compartment being closable by a battery compartment cover.

10. The device according to claim 8, wherein the battery is electrically connectable via a connecting cable firmly connected to the battery via a plug connector arrangement to the control unit for controlling an igniter of the trigger unit of the two dyestuff and trigger modules.

11. The device according to claim 1, wherein the second connecting element is formed by at least one recess in at least one of the sidewalls and a bottom of the value note transport container.

12. The device according to claim 1, wherein at least one of the second and a fourth connecting element are each formed by at least one of an opening formed in the value note transport container and an element projecting in the value note transport container.

13. The device according to claim 1, wherein the notes of value are receivable in the receiving area of the value note transport container as a stack and openings of the two dyestuff distributing units for distributing the dyestuff are arranged laterally with respect to the stack.

14. The device according to claim 1, wherein each one of the two dyestuff distributing units is configured to be removably connected to the value note transport container via at least one snap connection.

15. A cash box with a device according to claim 1 which is insertable into an automated teller machine and removable therefrom.

* * * * *